United States Patent
Kizumi et al.

(10) Patent No.: US 12,552,376 B2
(45) Date of Patent: Feb. 17, 2026

(54) VEHICLE CONTROL APPARATUS

(71) Applicant: Honda Motor Co., Ltd., Tokyo (JP)

(72) Inventors: Yuki Kizumi, Wako (JP); Umiaki Matsubara, Wako (JP); Takahiro Fujita, Wako (JP); Yuhi Goto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 353 days.

(21) Appl. No.: 18/101,216

(22) Filed: Jan. 25, 2023

(65) Prior Publication Data
US 2023/0242109 A1 Aug. 3, 2023

(30) Foreign Application Priority Data

Jan. 31, 2022 (JP) .................................. 2022-013350

(51) Int. Cl.
*B60W 30/12* (2020.01)
*G06V 10/776* (2022.01)
*G06V 20/56* (2022.01)

(52) U.S. Cl.
CPC ........... *B60W 30/12* (2013.01); *G06V 10/776* (2022.01); *G06V 20/588* (2022.01); *B60W 2420/403* (2013.01); *B60W 2552/53* (2020.02)

(58) Field of Classification Search
CPC .... G06V 20/588; G06V 10/40; G06V 10/776; B60W 2420/403; B60W 2552/53; B60W 30/12; G08G 1/167; G06T 2207/30256
See application file for complete search history.

(56) References Cited

U.S. PATENT DOCUMENTS

| | | | | |
|---|---|---|---|---|
| 5,790,403 A | * | 8/1998 | Nakayama | G06V 20/58 701/28 |
| 2012/0050489 A1 | * | 3/2012 | Gupta | G06V 20/588 348/148 |
| 2014/0063251 A1 | * | 3/2014 | Kim | G08G 1/0967 348/148 |
| 2015/0149036 A1 | * | 5/2015 | You | B60W 30/12 701/1 |

(Continued)

FOREIGN PATENT DOCUMENTS

| | | |
|---|---|---|
| JP | 2017220056 A | 12/2017 |
| JP | 2019059363 A | 4/2019 |

OTHER PUBLICATIONS

Japanese office action; Application 2022013350; Jun. 27, 2023.

*Primary Examiner* — Wilson W Tsui
(74) *Attorney, Agent, or Firm* — Duft & Bornsen, PC

(57) ABSTRACT

A vehicle control apparatus includes a microprocessor and an exterior environment detection unit configured to detect an exterior environment situation in a predetermined region around the subject vehicle. The microprocessor is configured to perform: recognizing a division line defining a lane of a road on which the subject vehicle travels based on a detection value of the exterior environment detection unit; acquiring a movement amount of the subject vehicle in a vehicle width direction; and determining a reliability of a recognition result of the division line based on a first movement amount which is the acquired movement amount of the subject vehicle and a second movement amount, which is a change amount of a recognized position of the division line in the vehicle width direction, when a traveling position of the subject vehicle moves in the vehicle width direction.

14 Claims, 4 Drawing Sheets

(56) References Cited

U.S. PATENT DOCUMENTS

2017/0320493 A1* 11/2017 Stephens ............... B60W 30/12
2019/0096258 A1 3/2019 Ide et al.
2019/0295420 A1* 9/2019 Fu ........................... G06T 7/248

* cited by examiner

VEHICLE CONTROL APPARATUS

CROSS-REFERENCE TO RELATED APPLICATION

This application is based upon and claims the benefit of priority from Japanese Patent Application No. 2022-013350 filed on Jan. 31, 2022, the content of which are incorporated herein by reference.

BACKGROUND OF THE INVENTION

Field of the Invention

This invention relates to a vehicle control system for controlling a traveling of a vehicle.

Description of the Related Art

Hitherto, as this type of apparatus, there has been known an apparatus that, when a division line of a lane are recognized based on a captured image of the surrounding of a subject vehicle, calculates a distance from the recognized division line to a three-dimensional object such as a curbstone assumed to exist along a road, and determines whether or not a recognition result of the division line is abnormal based on a change in the distance (for example, see JP 2017-220056 A). The apparatus described in JP 2017-220056 A determines that the recognition result of the division line is abnormal in a case where the distance from the division line recognized based on the captured image to the three-dimensional object along the road rapidly changes.

However, in a case of determining whether or not the recognition result of the division line is abnormal based on the change in the distance from the division line to the three-dimensional object along the road as in the apparatus described in JP 2017-220056 A, there is a possibility that the abnormality of the recognition result cannot be detected when the three-dimensional object is erroneously recognized as the division line.

SUMMARY OF THE INVENTION

An aspect of the present invention is a vehicle control apparatus configured to control an actuator for traveling so that a subject vehicle travels along a target path and including a microprocessor, a memory coupled to the microprocessor, and an exterior environment detection unit configured to detect an exterior environment situation in a predetermined region around the subject vehicle. The microprocessor is configured to perform: recognizing a division line defining a lane of a road on which the subject vehicle travels based on a detection value of the exterior environment detection unit; acquiring a movement amount of the subject vehicle in a vehicle width direction; and determining a reliability of a recognition result of the division line in the recognizing based on a first movement amount which is the movement amount of the subject vehicle acquired in the acquiring and a second movement amount, which is a change amount of a position of the division line in the vehicle width direction recognized in the recognizing, when a traveling position of the subject vehicle moves in the vehicle width direction.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1A to 4. A vehicle control apparatus according to the embodiment of the present invention can be applied to a vehicle having a self-driving capability, that is, a self-driving vehicle. Note that the vehicle control apparatus according to the embodiment of the present invention is applicable to both a manual driving vehicle and the self-driving vehicle having a driving assistance function, but for convenience of description, a case where the vehicle control apparatus is applied to the self-driving vehicle will be described below as an example. Further, a vehicle to which the vehicle control apparatus according to the present embodiment is applied may be referred to as a subject vehicle to be distinguished from other vehicles. The subject vehicle may be any of an engine vehicle having an internal combustion engine as a traveling drive source, an electric vehicle having a traveling motor as a traveling drive source, and a hybrid vehicle having an engine and a traveling motor as traveling drive sources. The subject vehicle can travel not only in a self-drive mode in which driving operation by a driver is unnecessary, but also in a manual drive mode with driving operation by the driver.

Examples of one self-driving capability of the self-driving vehicle include a function of controlling a traveling actuator in such a way as to travel near the center of the current lane (which will hereinafter be referred to as a lane keeping function). In a case where the lane keeping function is activated, the self-driving vehicle recognizes division lines that define the current lane based on image data (which will hereinafter be referred to as captured image data or simply referred to as a captured image) obtained by an imaging unit installed at a predetermined portion (for example, an upper portion of a windshield) of the vehicle, and controls the traveling actuator in such a way that the subject vehicle travels near the center of the current lane based on information of the recognized division lines.

Figure 1A:
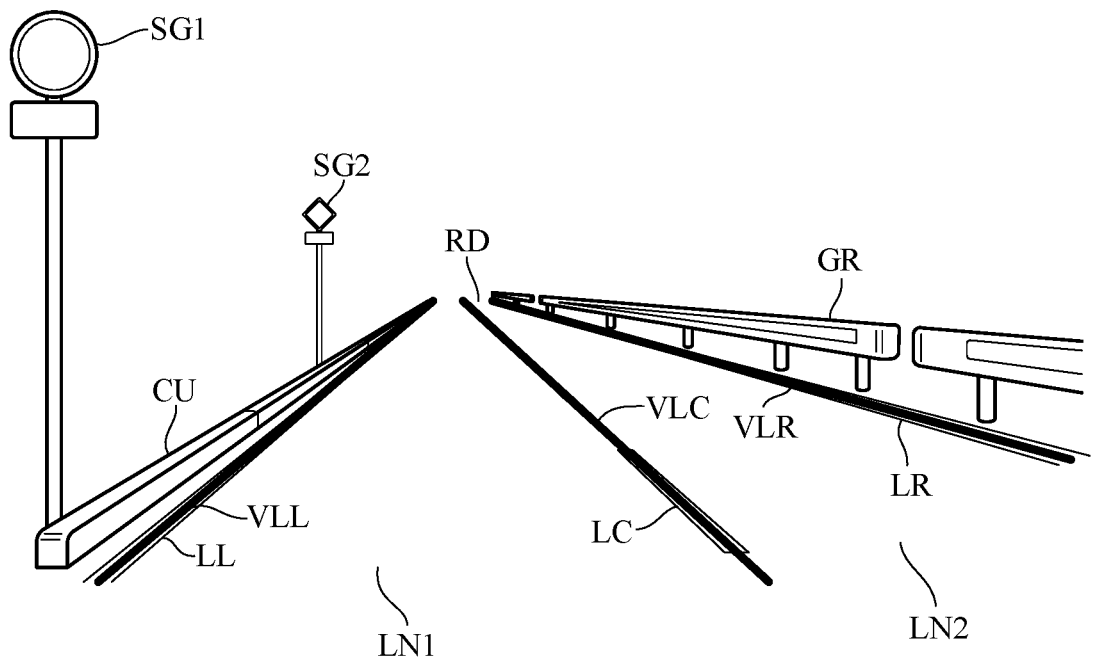
FIG. 1A is a diagram illustrating an example of a recognition result of a division line.
Figure 1B:
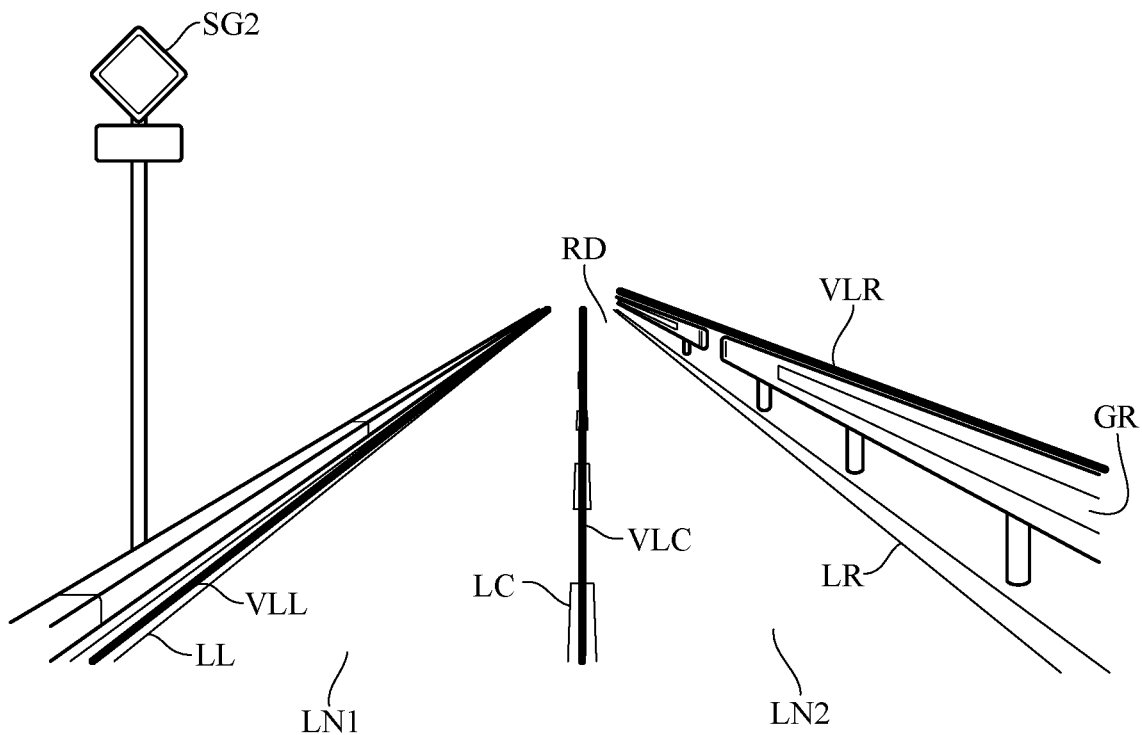
FIG. 1B is a diagram illustrating another example of the recognition result of the division line.

By the way, when a vehicle protection fence such as a guardrail or a curbstone is installed along a road, a contour of the vehicle protection fence or the curbstone may be erroneously recognized as a division line. FIGS. 1A and 1B are diagrams illustrating an example of a recognition result of the division line displayed in such a way as to be superimposed on a captured image obtained by the imaging unit installed on a front side of the subject vehicle.

FIG. 1A illustrates a captured image when the subject vehicle is traveling in a lane LN1 on the left side of a two-lane road RD on one side of left-hand traffic, and a recognition result of the division line based on the captured image (which will hereinafter be referred to as virtual division lines). Thick lines VLL, VLC, and VLR in the drawing represent virtual division lines corresponding to division lines LL, LC, and LR that are installed on the road RD and define the lanes LN1 and LN2. Signs SG1 and SG2 and a curbstone CU are installed on the left side of the road RD. A guard rail GR is installed at the center of the road RD (on the right side of the right lane LN2). In the example illustrated in FIG. 1A, erroneous recognition of the division lines does not occur, and the positions of the virtual division lines VLL, VLC, and VLR substantially coincide with the positions of the actual division lines LL, LC, and LR.

FIG. 1B illustrates a captured image at a time point when a predetermined time has elapsed from a time point of FIG. 1A and when the subject vehicle is making a lane change from the lane LN1 to the lane LN2. Similarly to FIG. 1A, FIG. 1B illustrates virtual division lines which are a recognition result of the division line. In the example illustrated in FIG. 1B, a contour (an upper end portion) of the guard rail GR is erroneously recognized as the division line LR, and the virtual division line VLR is recognized at a position different from the position of the actual division line LR. As described above, when the subject vehicle moves in a vehicle width direction due to a lane change or the like, the contour of the three-dimensional object installed along the road is likely to be erroneously recognized as the division line, and in a case where self-driving is continued according to the erroneously recognized division line (virtual division line), the subject vehicle may depart from the road or approach or come into contact with the three-dimensional object on a road shoulder. Thus, for dealing with such a problem, the vehicle control apparatus is configured as follows according to the present embodiment.

Figure 2:
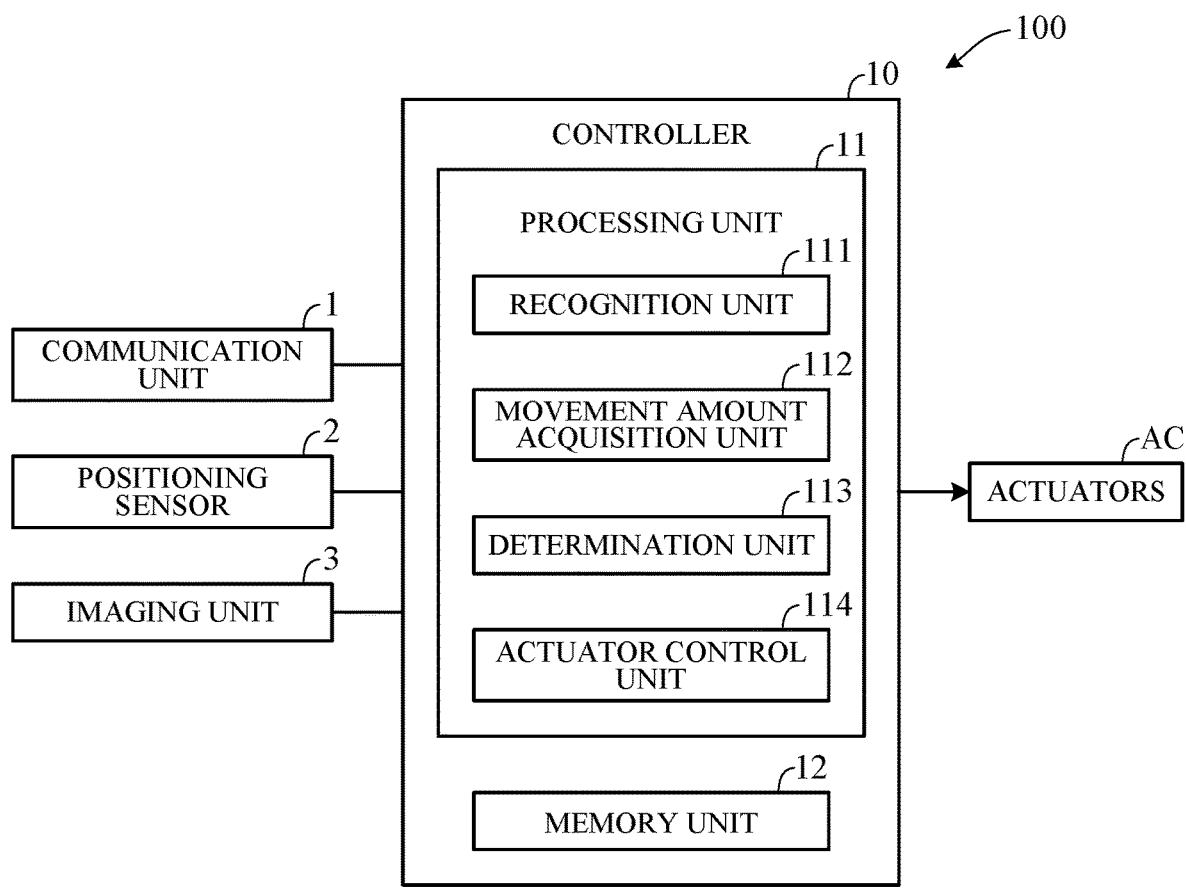
FIG. 2 is a block diagram schematically illustrating a main part configuration of a vehicle control apparatus according to an embodiment of the present invention.

FIG. 2 is a block diagram schematically illustrating a main part configuration of a vehicle control apparatus 100 according to the embodiment of the present invention. As illustrated in FIG. 2, the vehicle control apparatus 100 includes a controller 10, and a communication unit 1, a positioning sensor 2, an imaging unit 3, and actuators AC, which are each communicatively connected to the controller 10.

The communication unit 1 communicates with various apparatus (not illustrated) via a network including a wireless communication network represented by the Internet network or a mobile phone network. The network includes not only a public wireless communication network but also a closed communication network provided for each predetermined management region, for example, a wireless LAN, Wi-Fi (registered trademark), Bluetooth (registered trademark), and the like.

A positioning sensor 2 receives a positioning signal transmitted from a positioning satellite. The positioning satellite is an artificial satellite such as a global positioning system (GPS) satellite or a quasi-zenith satellite. Positioning information received by the positioning sensor 2 is used to measure the current position (latitude, longitude, and altitude) of the subject vehicle. The positioning sensor 2 is used to detect the position of the subject vehicle. Therefore, a distance detection unit (for example, a radar or LiDAR) that detects a distance from the subject vehicle to an object (an object on the road) may be used instead of the positioning sensor 2. In this case, the position of the subject vehicle is detected based on position information of the object on the road obtained from map information stored in a memory unit 12 and information on the distance to the object obtained by the positioning sensor 2. The positioning sensor 2 may be a combination of a receiver for positioning signals and the distance detection unit.

The imaging unit 3 includes an imaging device (image sensor) such as a CCD or a CMOS. The imaging unit 3 captures images of a predetermined region around the subject vehicle. Specifically, the imaging unit 3 is mounted at a predetermined portion (such as an upper portion of the windshield) of the subject vehicle, and continuously captures images of a space in front of the subject vehicle to acquire image data. The imaging unit 3 may be a monocular camera or a stereo camera.

The actuators AC includes a throttle actuator and a traveling actuator such as a shift actuator, a brake actuator, and a steering actuator.

The controller 10 includes an electronic control unit (ECU). More specifically, the controller 10 includes a computer including a processing unit 11 such as a CPU (microprocessor), the memory unit 12 such as a ROM or a RAM, and other peripheral circuits (not illustrated) such as an I/O interface. Although a plurality of ECUs having different functions such as an engine control ECU, a traveling motor control ECU, and a braking device ECU may be separately provided, in FIG. 2, the controller 10 is illustrated as a set of these ECUs for convenience.

The memory unit 12 stores information such as various control programs and thresholds used in the programs. The processing unit 11 includes, as its functional configuration, a recognition unit 111, a movement amount acquisition unit 112, a determination unit 113, and an actuator control unit 114.

The recognition unit 111 recognizes an exterior environment situation in a predetermined region around the subject vehicle based on the captured image data acquired by the imaging unit 3. Specifically, the recognition unit 111 recognizes the division line included in an image capturing range based on the captured image acquired by the imaging unit 3. The recognition unit 111 stores, in the memory unit 12, information including a result of recognizing division lines that define each lane of the road on which the subject vehicle travels (which will hereinafter be referred to as the division line information). The division line information includes information indicating the position and shape of the division line recognized by the recognition unit 111, that is, the virtual division line.

The movement amount acquisition unit 112 acquires a movement amount of the subject vehicle in the vehicle width direction. Specifically, first, the movement amount acquisition unit 112 acquires information for estimating the position of the subject vehicle (which will hereinafter be referred to as odometry information). The odometry information includes detection values of a wheel speed sensor (not illustrated) and a steering angle sensor (not illustrated) installed in the subject vehicle. Then, the movement amount acquisition unit 112 acquires the movement amount of the subject vehicle in the vehicle width direction based on the odometry information. Note that the movement amount acquisition unit 112 may acquire the movement amount of the subject vehicle in the vehicle width direction based on the detection value of the positioning sensor 2.

The determination unit 113 determines, based on the division line information stored in the memory unit 12 by the recognition unit 111, a reliability of the recognition result of the division line by the recognition unit 111, that is, a reliability of the virtual division line. The determination unit 113 determines the reliability of the virtual division line based on a movement amount MV1, which is a lateral movement amount (the movement amount in the vehicle width direction) of the subject vehicle acquired by the movement amount acquisition unit 112 when the traveling position of the subject vehicle moves in the vehicle width direction, and a movement amount MV2, which is a lateral movement amount (a position change amount in the vehicle width direction) of the division line (virtual division line) recognized by the recognition unit 111. The movement amount MV2 is a change amount of the recognized position of the division line on the captured image, that is, a change amount of the position of the virtual division line on the captured image. Note that a value obtained by calculating change amounts of the positions of a plurality of different points on the virtual division line and averaging the calculated change amounts of the positions of the points may be determined as the movement amount MV2, or the movement amount MV2 may be determined using another calculation method. The determination unit 113 determines the reliability of each of the virtual division lines VLL, VLC, and VLR based on the movement amount MV1 corresponding to each of the division lines LL, LC, and LR and the movement amount MV2 corresponding to each of the virtual division lines VLL, VLC, and VLR.

When a difference between the movement amount MV1 and the movement amount MV2 is within a predetermined range, the determination unit 113 determines that the reliability of the virtual division line is higher than when the difference exceeds the predetermined range. More specifically, the determination unit 113 determines that the smaller the difference between the movement amount MV1 and the movement amount MV2, the higher the reliability of the virtual division line.

When the determination unit 113 determines that the reliability of the virtual division line is high, the actuator control unit 114 generates the target path based on the virtual division line. The target path is a driving path from a current time point to a predetermined time ahead. When it is determined that the reliability of the pair of left and right virtual division lines corresponding to the current lane is high, the actuator control unit 114 generates a target path based on the pair of left and right virtual division lines. In the example of FIG. 1A, in a case where it is determined that the reliability of the virtual division lines VLL and VLC corresponding to the lane LN1 is high, the target path is generated based on the virtual division lines VLL and VLC. In a case where it is determined that the reliability of the virtual division lines VLC and VLR corresponding to the destination lane LN2 is high when the subject vehicle is making a lane change as illustrated in FIG. 1B and after completion of the lane change, the target path is generated based on the virtual division lines VLC and VLR. The actuator control unit 114 controls the actuators AC in such a way that the subject vehicle travels along the generated target path. On the other hand, in a case where the determination unit 113 determines that the reliability of the virtual division line is low, the actuator control unit 114 determines that there is a possibility that the subject vehicle departs from the road, and requests an occupant to perform driving operation such as steering wheel operation (hereinafter, the request is referred to as a hands-on request). Specifically, the actuator control unit 114 outputs a command (voice information or image information) for requesting driving operation via a speaker (not illustrated) or a display (not illustrated) installed in a vehicle compartment of the subject vehicle.

Figure 3:
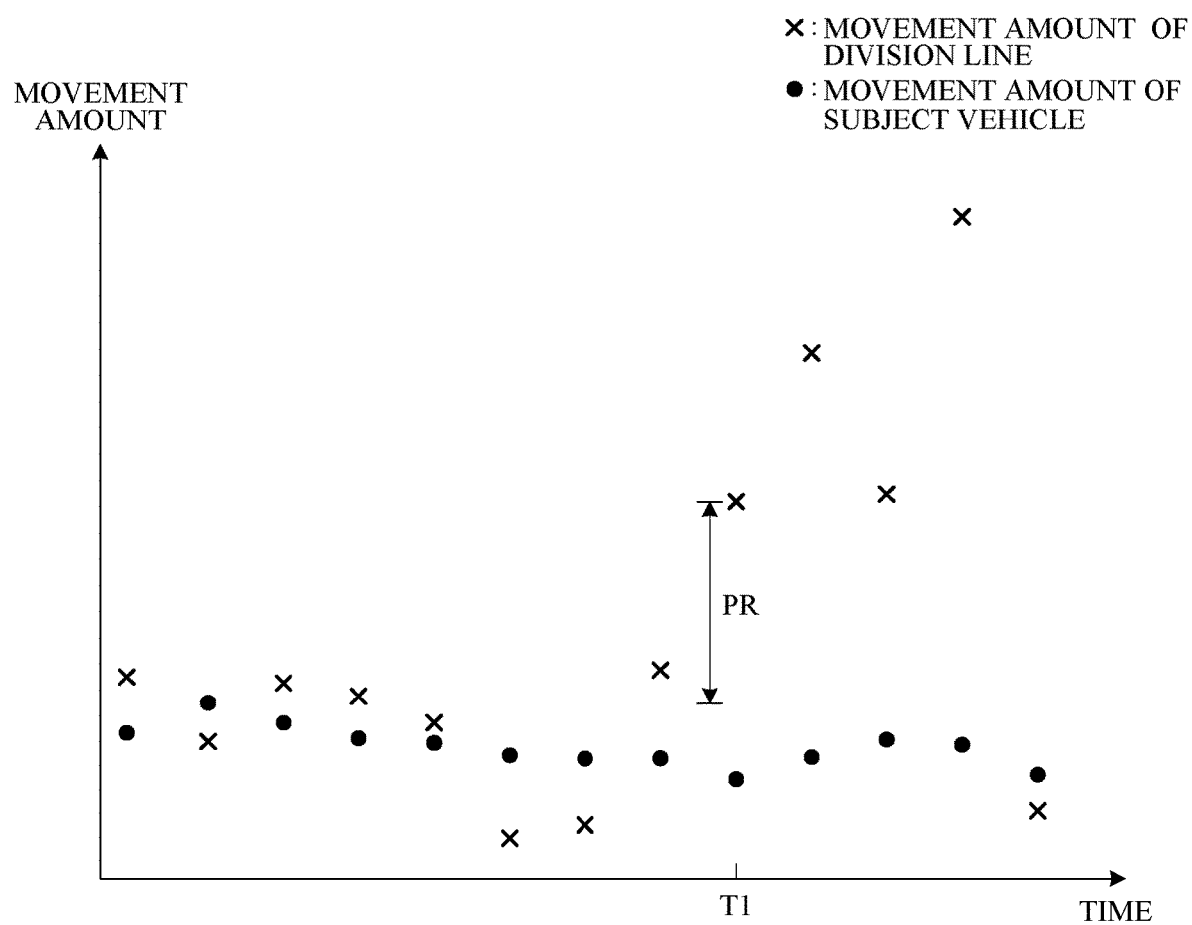
FIG. 3 is a graph illustrating a movement amount of a subject vehicle and a movement amount of the division line for each predetermined time when the subject vehicle is making a lane change.

FIG. 3 is a graph illustrating the movement amount MV1 of the subject vehicle and the movement amount MV2 of the virtual division line for each predetermined time when the subject vehicle traveling in the lane LN1 of the road RD is making a lane change to the lane LN2. The movement amount MV1 of the subject vehicle is plotted as a black dot, and the movement amount MV2 of the virtual division line VLR corresponding to the division line LR is plotted as a cross mark. In FIG. 3, a difference between the movement amount MV1 of the subject vehicle and the movement amount MV2 of the virtual division line VLR exceeds a predetermined range PR with a time point T1 as a boundary. Therefore, the hands-on request is made at the time point T1. Note that, at the time point T1, other processing may be executed instead of or together with the hands-on request. For example, when a division line other than the division line LR is recognized with a high reliability by the recognition unit 111, the self-drive mode (self-driving by the lane keeping function) may be continued using the recognition result (virtual division line) of the division line other than the division line LR.

Figure 4:
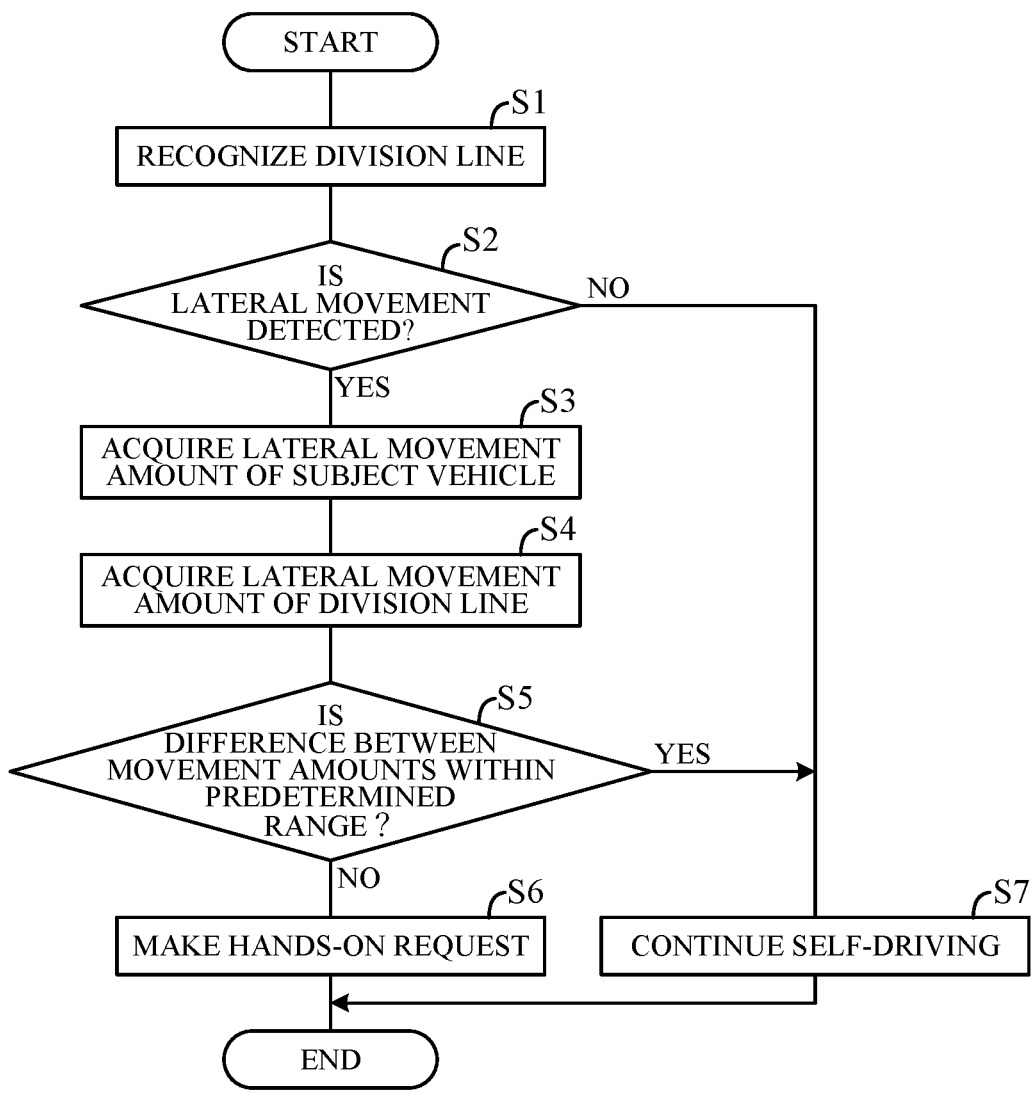
FIG. 4 is a flowchart illustrating an example of processing executed by the CPU of the controller in FIG. 2.

FIG. 4 is a flowchart illustrating an example of processing executed by the CPU of the controller 10 in FIG. 2 according to a pre-stored program. The processing in the flowchart is executed, for example, at a predetermined cycle while the subject vehicle is traveling in the self-drive mode.

First, in step S1, a division line of a road on which the subject vehicle is traveling is recognized based on the captured image acquired by the imaging unit 3. In step S2, it is determined whether or not lateral movement (movement in the vehicle width direction) of the subject vehicle has been detected. The lateral movement of the subject vehicle is detected by a lateral acceleration sensor (not illustrated) that detects acceleration (lateral acceleration) in the vehicle width direction. The lateral movement of the subject vehicle may be detected by other methods.

If NO in step S2, the processing proceeds to step S7. If YES in step S2, in step S3, the current position of the subject vehicle is acquired, and a lateral movement amount (a movement amount in the vehicle width direction) of the subject vehicle is acquired by comparison with the previous value. Next, in step S4, the recognized position (the position of the virtual division line on the captured image) of the division line recognized by the recognition unit 111 is acquired, and a movement amount of the virtual division line on the captured image is acquired by comparison with the previous value. In step S5, the lateral movement amount of the subject vehicle acquired in step S3 is compared with the movement amount of the virtual division line acquired in step S4, and it is determined whether or not a difference between the movement amounts is within a predetermined range.

If YES in step S5, it is determined in step S7 that a reliability of the recognition result of the division line in step S1 is high, and the actuators AC is controlled in such a way that the subject vehicle travels according to the virtual division line which is the recognition result of the division line. Accordingly, the self-driving of the subject vehicle is continued. On the other hand, if NO in step S5, it is determined in step S6 that the reliability of the recognition result of the division line in step S1 is low. When the reliability of the recognition result (virtual division line) is low, there is a possibility that the vehicle departs from the road at the time of self-driving according to the virtual division line. Therefore, the occupant is requested to perform driving operation such as steering wheel operation.

In the present embodiment, the following operations and effects are achievable.

(1) The vehicle control apparatus 100 controls the traveling actuator in such a way that the subject vehicle travels along a lane defined by division lines. The vehicle control apparatus 100 includes the imaging unit 3 that detects the exterior environment situation in the predetermined region around the subject vehicle, the recognition unit 111 that recognizes the division lines LL, LC, and LR that define the lanes of the road on which the subject vehicle travels based on the detection value (captured image data) of the imaging unit 3, the movement amount acquisition unit 112 that acquires the movement amount of the subject vehicle in the vehicle width direction, and the determination unit 113 that determines the reliability of the recognition result of the division line by the recognition unit 111 based on the movement amount MV1 of the subject vehicle acquired by the movement amount acquisition unit 112 and the movement amount MV2, which is a change amount of the position of the division line in the vehicle width direction recognized by the recognition unit 111, when the traveling position of the subject vehicle moves in the vehicle width direction. Therefore, it is possible to accurately determine erroneous recognition of a division line of a road. As a result, it is possible to travel satisfactorily even on a road on which a three-dimensional object having a contour that is likely to be erroneously recognized as a division line is installed on a road shoulder, and traffic safety can thus be improved. In addition, by causing a vehicle to which the vehicle control apparatus 100 is applied to travel on a road while moving laterally, it is also possible to grasp in advance a point where erroneous recognition of a division line is likely to occur.

(2) When a difference between the movement amount MV1 of the subject vehicle and the movement amount MV2 of the division line is within a predetermined range, the determination unit 113 determines that the reliability of the recognition result of the division line is higher than when the difference exceeds the predetermined range. Specifically, the determination unit 113 determines that the smaller the difference between the movement amount MV1 of the subject vehicle and the movement amount MV2 of the division line, the higher the reliability of the recognition result of the division line. Therefore, it is possible to accurately determine whether or not erroneous recognition of a division line has occurred.

(3) The vehicle control apparatus 100 further includes the actuator control unit 114 that controls the actuators AC in such a way that the subject vehicle travels along the lane defined by the division line recognized by the recognition unit 111 when the determination unit 113 determines that the reliability of the recognition result of the division line is high. When the determination unit 113 determines that the reliability of the recognition result of the division line is low, the actuator control unit 114 outputs a command for requesting the occupant to perform driving operation. As a result, it is possible to prevent self-driving from being continued according to the falsely recognized division line. In addition, since the occupant is requested to perform driving operation before the subject vehicle departs from the road, traffic safety can be further improved.

The above-described embodiment can be modified into various forms. Some modifications will be described below. In the above-described embodiment, the imaging unit 3 detects the exterior environment situation in the predetermined region around the subject vehicle, as an exterior environment detection unit. However, the exterior environment detection unit may be other than the imaging unit (camera), or may be a radar or LiDAR. Furthermore, in the above-described embodiment, the vehicle control apparatus 100 including one imaging unit as the exterior environment detection unit has been described as an example, but the vehicle control apparatus may include a plurality of exterior environment detection units. In the above-described embodiment, the recognition unit 111 recognizes the exterior environment situation in the predetermined region around the subject vehicle based on the captured image acquired by the imaging unit 3, but the configuration of the recognition unit is not limited thereto. The recognition unit may recognize the exterior environment situation in the predetermined region around the subject vehicle based on information obtained through road-to-vehicle and vehicle-to-vehicle communications via the communication unit 1.

In the above-described embodiment, the vehicle control apparatus 100 in which the processing unit 11 of the controller 10 functions as the recognition unit 111 has been described as an example, but the configuration of the vehicle control apparatus is not limited thereto. More specifically, in a case where the imaging unit 3 includes a computer including a processing unit (not illustrated) such as a CPU (microprocessor), a memory unit (not illustrated) such as a ROM and a RAM, and other peripheral circuits (not illustrated) such as an I/O interface, the processing unit may include the recognition unit as a functional configuration.

In the above-described embodiment, the determination unit 113 compares the movement amount MV2 of the division line recognized by the recognition unit 111 with the movement amount MV1 of the subject vehicle to determine the reliability of the virtual division line. However, the method for determining the reliability of the virtual division line is not limited thereto. The determination unit may determine the reliability of the virtual division line by comparing the movement amount of the division line recognized within a predetermined distance from the subject vehicle in the traveling direction among the division lines recognized by the recognition unit 111 with the movement amount of the subject vehicle. As described above, the reliability of the virtual division line can be accurately determined by not using a distant division line whose recognition accuracy is likely to be low in a comparison of the movement amount with the subject vehicle. A distance at which the division line can be recognized with required recognition accuracy based on the detection accuracy of the imaging unit 3 and the traveling speed of the subject vehicle is determined as the predetermined distance. In the above-described embodiment, the determination unit 113 compares the movement amount MV1, which is the lateral movement amount of the subject vehicle, with the movement amount MV2, which is the lateral movement amount of the division line, to determine the reliability of the virtual division line. However, the movement amount MV1 may include a movement amount of the subject vehicle in a height direction. Similarly, the movement amount MV2 may include a movement amount of the division line in the height direction. Furthermore, in the above-described embodiment, an example in which the vehicle control apparatus is applied to a self-driving vehicle having the lane keeping function as one of the self-driving capabilities has been described, but the present invention can be similarly applied to a manual driving vehicle having the lane keeping function or the like as one of driving assistance functions.

The above embodiment can be combined as desired with one or more of the above modifications. The modifications can also be combined with one another.

According to the present invention, it is possible to accurately determine erroneous recognition of a division line.

Above, while the present invention has been described with reference to the preferred embodiments thereof, it will be understood, by those skilled in the art, that various changes and modifications may be made thereto without departing from the scope of the appended claims.

What is claimed is:

1. A vehicle control apparatus configured to control an actuator for traveling so that a subject vehicle travels along a target path, the vehicle control apparatus comprising:
a microprocessor and a memory coupled to the microprocessor; and
a camera configured to detect an exterior environment situation in a predetermined region around the subject vehicle, wherein
the microprocessor is configured to perform:
recognizing a division line defining a lane of a road on which the subject vehicle travels based on a detection value of the camera;
acquiring, based on odometry information, a movement amount of the subject vehicle in a vehicle width direction;
determining a reliability of a recognition result of the division line based on a first movement amount which is the movement amount of the subject vehicle and a second movement amount which is a change amount of a position of the division line in the vehicle width direction, each of which is obtained over a same predetermined time period at each predetermined time while a traveling position of the subject vehicle moves in the vehicle width direction; and
controlling the actuator in such a way that the subject vehicle travels along the lane defined by the division line when the reliability is determined to be high, wherein
the microprocessor is configured to perform
the determining including, when a difference between the first movement amount and the second movement amount is within a predetermined range, determining that the reliability is higher than when the difference exceeds the predetermined range.

2. The traveling control apparatus according to claim 1, wherein
the microprocessor is configured to perform
the determining including determining that the smaller the difference between the first movement amount and the second movement amount, the higher the reliability.

3. The traveling control apparatus according to claim 1, wherein
the microprocessor is configured to perform
the controlling including, when the reliability is determined to be low, outputting a command for requesting an occupant to perform a driving operation.

4. The traveling control apparatus according to claim 1, wherein
the camera is configured to capture a space in front of the subject vehicle, and
the microprocessor is configured to perform
the recognizing including recognizing the division line defining the lane of the road on which the subject vehicle travels based on the captured image acquired by the camera.

5. The traveling control apparatus according to claim 1, wherein
the microprocessor is configured to perform
the determining including calculating change amounts of positions of a plurality of different points on the division line when the traveling position of the subject vehicle moves in the vehicle width direction to determine the reliability by using a value obtained by averaging change amounts of positions of the plurality of different points as the second movement amount.

6. The traveling control apparatus according to claim 1, wherein
the microprocessor is configured to perform
the determining including determining the reliability by using a movement amount of the division line recognized within a predetermined distance from the subject vehicle in a traveling direction among multiple division lines recognized as the second movement amount.

7. The traveling control apparatus according to claim 1, wherein
the microprocessor is configured to perform
the acquiring including acquiring a current position of the subject vehicle at predetermined intervals, and acquiring the first movement amount of the subject vehicle in the vehicle width direction by comparing a present value of the current position with a previous value of the current position.

8. The traveling control apparatus according to claim 1, wherein
the odometry information includes a detection value of a wheel speed sensor or a steering angle sensor installed in the subject vehicle.

9. A vehicle control apparatus configured to control an actuator for traveling so that a subject vehicle travels along a target path, the vehicle control apparatus comprising:
a microprocessor and a memory coupled to the microprocessor, and
a camera configured to detect an exterior environment situation in a predetermined region around the subject vehicle, wherein
the microprocessor is configured to function as:
a recognition unit configured to recognize a division line defining a lane of a road on which the subject vehicle travels based on a detection value of the camera;
a movement amount acquisition unit configured to acquire, based on odometry information, a movement amount of the subject vehicle in a vehicle width direction;
a determination unit configured to determine a reliability of a recognition result of the division line by the recognition unit based on a first movement amount which is the movement amount of the subject vehicle acquired by the movement amount acquisition unit and a second movement amount which is a change amount of a position of the division line in the vehicle width direction recognized by the recognition unit, each of which is obtained over a same predetermined time period at each predetermined time while a traveling position of the subject vehicle moves in the vehicle width direction; and
an actuator control unit configured to control the actuator in such a way that the subject vehicle travels along the lane defined by the division line recognized by the recognition unit when the reliability is determined to be high by the determination unit, wherein
the determination unit is configured to, when a difference between the first movement amount and the second movement amount is within a predetermined range, determine that the reliability is higher than when the difference exceeds the predetermined range.

10. The traveling control apparatus according to claim 9, wherein
the determination unit is configured to determine that the smaller the difference between the first movement amount and the second movement amount, the higher the reliability.

11. The traveling control apparatus according to claim 9, wherein
the actuator control unit is configured to, when the reliability is determined to be low by the determination unit, output a command for requesting an occupant to perform a driving operation.

12. The traveling control apparatus according to claim 9, wherein
the camera is configured to capture a space in front of the subject vehicle, and
the recognition unit is configured to recognize the division line defining the lane of the road on which the subject vehicle travels based on the captured image acquired by the camera.

13. The traveling control apparatus according to claim 9, wherein
the determination unit is configured to calculate change amounts of positions of a plurality of different points on the division line recognized by the recognition unit when the traveling position of the subject vehicle moves in the vehicle width direction to determine the reliability by using a value obtained by averaging change amounts of positions of the plurality of different points as the second movement amount.

14. The traveling control apparatus according to claim 9, wherein
the determination unit is configured to determine the reliability by using a movement amount of the division line recognized within a predetermined distance from the subject vehicle in a traveling direction among multiple division lines recognized by the recognition unit as the second movement amount.

\* \* \* \* \*